(12) United States Patent
Son et al.

(10) Patent No.: US 10,371,987 B2
(45) Date of Patent: Aug. 6, 2019

(54) LIQUID CRYSTAL DISPLAY

(71) Applicant: SAMSUNG DISPLAY CO., LTD., Yongin, Gyeonggi-do (KR)

(72) Inventors: Jeong Man Son, Suwon-si (KR); Min Wook Park, Cheonan-si (KR); Deok Ho Kang, Seoul (KR); Dong Hee Ye, Daegu (KR); Jin Young Lee, Suwon-si (KR)

(73) Assignee: SAMSUNG DISPLAY CO., LTD., Gyeonggid-Do (KR)

( * ) Notice: Subject to any disclaimer, the term of this patent is extended or adjusted under 35 U.S.C. 154(b) by 402 days.

(21) Appl. No.: 15/069,122

(22) Filed: Mar. 14, 2016

(65) Prior Publication Data

US 2016/0377923 A1 Dec. 29, 2016

(30) Foreign Application Priority Data

Jun. 26, 2015 (KR) .......................... 10-2015-0090991

(51) Int. Cl.
*G02F 1/1337* (2006.01)

(52) U.S. Cl.
CPC ............... *G02F 1/133707* (2013.01); *G02F 2001/133776* (2013.01)

(58) Field of Classification Search
CPC .............. G02F 1/133707; G02F 2001/133776
See application file for complete search history.

(56) References Cited

U.S. PATENT DOCUMENTS

| | | | | |
|---|---|---|---|---|
| 6,061,106 A | * | 5/2000 | Ahn | G02F 1/133371 349/106 |
| 2005/0219452 A1 | * | 10/2005 | Chen | G02F 1/133707 349/143 |
| 2007/0004071 A1 | * | 1/2007 | Lee | G02F 1/133707 438/30 |
| 2009/0009703 A1 | * | 1/2009 | Tamaki | G02F 1/133788 349/123 |
| 2009/0207359 A1 | * | 8/2009 | Shin | G02F 1/133707 349/129 |
| 2015/0234239 A1 | | 8/2015 | Son et al. | |
| 2017/0102590 A1 | * | 4/2017 | Wang | G02F 1/133512 |

FOREIGN PATENT DOCUMENTS

| | | |
|---|---|---|
| CN | 103631044 A | 3/2014 |
| KR | 1020060038078 A | 5/2006 |
| KR | 0787356 B1 | 12/2007 |
| KR | 0928758 B1 | 11/2009 |
| KR | 1437870 B1 | 8/2014 |
| KR | 1020150080147 A | 7/2015 |
| KR | 1020160085110 | 7/2016 |
| KR | 1020160089572 | 7/2016 |
| KR | 1020160096266 | 8/2016 |

* cited by examiner

*Primary Examiner* — Nathanael R Briggs
(74) *Attorney, Agent, or Firm* — Cantor Colburn LLP

(57) ABSTRACT

A liquid crystal display includes a first panel which includes a first electrode including a first protrusion and a first alignment layer disposed on the first electrode, a second panel which is disposed to face the first panel, and which includes a second electrode including a second protrusion disposed in a region corresponding to the first protrusion and a second alignment layer disposed on the second electrode, and a liquid crystal layer which is disposed between the first panel and the second panel, where the first protrusion and the second protrusion vertically face each other.

20 Claims, 13 Drawing Sheets

LIQUID CRYSTAL DISPLAY

This application claims priority to Korean Patent Application No. 10-2015-0090991 filed on Jun. 26, 2015, and all the benefits accruing therefrom under 35 U.S.C. § 119, the content of which in its entirety is herein incorporated by reference.

BACKGROUND

1. Field

Exemplary embodiments of the invention relate to a liquid crystal display ("LCD"), and, more particularly, to a vertically-aligned LCD.

2. Description of the Related Art

A liquid crystal display ("LCD"), which is one of the most widely used flat panel displays, is a display device that controls the amount of transmitted light by applying a voltage to an electrode to rearrange the liquid crystal molecules in a liquid crystal layer.

LCDs are largely classified into vertically-aligned LCDs and horizontally-aligned LCDs according to the arrangement method of liquid crystal molecules. Among these, a vertically-aligned LCD is characterized in that liquid crystal molecules are arranged such that the major axis thereof is aligned in a direction perpendicular to a display panel, and has an advantage of having a large contrast ratio and a wide viewing angle.

In a vertically-aligned LCD, in order to increase a viewing angle, an alignment layer is configured to allow liquid crystals to have a pre-tilt angle using a photo-alignment technology.

According to such a photo-alignment technology, in order to increase a viewing angle, the liquid crystals in the alignment layer must have pre-tilt angle of at least four directions. For this purpose, the alignment layer must be divided into four regions, and each of the regions must be separately irradiated with light.

SUMMARY

In a photo-alignment technology, when a liquid crystal display ("LCD") is irradiated with light, only a desired portion thereof is irradiated with light using a shadow mask. Therefore, it may be beneficial to have high alignment precision between the shadow mask and a pixel. Further, when an LCD is irradiated with light, errors may be caused in the alignment direction by an optical diffraction effect, so as to decrease a contrast ratio.

Exemplary embodiments provide an LCD including liquid crystal molecules to have a predetermined pre-tilt angle without using a photo-alignment technology and which can realize a plurality of domains.

Exemplary embodiments disclose an LCD including a first panel which includes a first electrode including a first protrusion and a first alignment layer disposed on the first electrode, a second panel which is disposed to face the first panel, and which includes a second electrode including a second protrusion disposed in a region corresponding to the first protrusion and a second alignment layer disposed on the second electrode, and a liquid crystal layer which is disposed between the first panel and the second panel, where the first protrusion and the second protrusion vertically face each other.

Each of the first alignment layer and the second alignment layer may be a vertical alignment layer including polyimide.

In an exemplary embodiment, the first panel and the second panel may be attached to each other to provide a plurality of pixels, and each of the plurality of pixels may be provided with the first protrusion and the second protrusion.

In an exemplary embodiment, the first protrusion and the second protrusion provided in each of the plurality of pixels may be diagonally inclined at predetermined angles, and the predetermined angles may be different from each other for each of the plurality of pixels.

In an exemplary embodiment, the first protrusion may include a first inclination which is diagonally inclined upward in one direction, a second inclination which is diagonally inclined downward in the other direction and a first ridge which is disposed between the first inclination and the second inclination, where the first ridge is located at the center of the first electrode.

In an exemplary embodiment, the first protrusion may include a third inclination which is diagonally inclined upward in one direction, a fourth inclination which is diagonally inclined downward in the other direction and a second ridge which is disposed between the third inclination and the fourth inclination, where the second ridge faces the first ridge, and the second ridge is disposed in a direction perpendicular to the first ridge.

In an exemplary embodiment, the first protrusion may include a first inclination which is diagonally inclined downward in one direction, a second inclination which is diagonally inclined upward in the other direction, and a first valley which is disposed between the first inclination and the second inclination, where the first valley is located at the center of the first electrode.

In an exemplary embodiment, the second protrusion may include a third inclination which is diagonally inclined upward in one direction, a fourth inclination which is diagonally inclined downward in the other direction and a second ridge which is disposed between the third inclination and the fourth inclination, where the second ridge faces the first valley, and the second ridge is disposed in a direction perpendicular to the first valley.

In an exemplary embodiment, the second protrusion may include a third inclination which is diagonally inclined downward in one direction, a fourth inclination which is diagonally inclined upward in the other direction and a second valley which is disposed between the third inclination and the fourth inclination, where the second valley faces the first valley, and the second valley is disposed in a direction perpendicular to the first valley.

Exemplary embodiments also disclose a liquid crystal device including a first insulating substrate, a switching element which is disposed on the first insulating substrate, a protective layer which is disposed on the switching element and which include a first ridge, a first valley, and a first inclination diagonally inclined between the first ridge and the first valley, a pixel electrode which is disposed on the protective layer, a first alignment layer which is disposed on the pixel electrode, a second insulating substrate which is disposed to face the first insulating substrate, a color filter which is disposed on the second insulating substrate, an overcoating layer which is disposed on the color filter and which include a second ridge, a second valley, and a second inclination diagonally inclined between the second ridge and the second valley, a common electrode which is disposed on the overcoating layer and a second alignment layer which is disposed on the common, where the first ridge and the first valley are disposed to correspond to the second ridge or the second valley, and the first ridge and the first valley vertically face the second ridge or the second valley.

In an exemplary embodiment, each of the first alignment layer and the second alignment layer may be a vertical alignment layer including polyimide.

In an exemplary embodiment, the first ridge may be disposed to correspond to the center of the pixel electrode.

In an exemplary embodiment, the second ridge may be disposed to correspond to the first ridge.

In an exemplary embodiment, the switching element may be disposed to correspond to the first ridge.

In an exemplary embodiment, a light blocking pattern may be further disposed between the second insulating substrate and the color filter, and the light blocking pattern is disposed to correspond to the second valley.

In an exemplary embodiment, the first valley may be disposed to correspond to the center of the pixel electrode.

In an exemplary embodiment, the second valley may be disposed to correspond to the first valley.

In an exemplary embodiment, the switching element may be disposed to correspond to the first ridge.

In an exemplary embodiment, a light blocking pattern may be further disposed between the second insulating substrate and the color filter, and the light blocking pattern is disposed to correspond to the second ridge.

In an exemplary embodiment, the second ridge may be disposed to correspond to the first valley.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Figure 1:
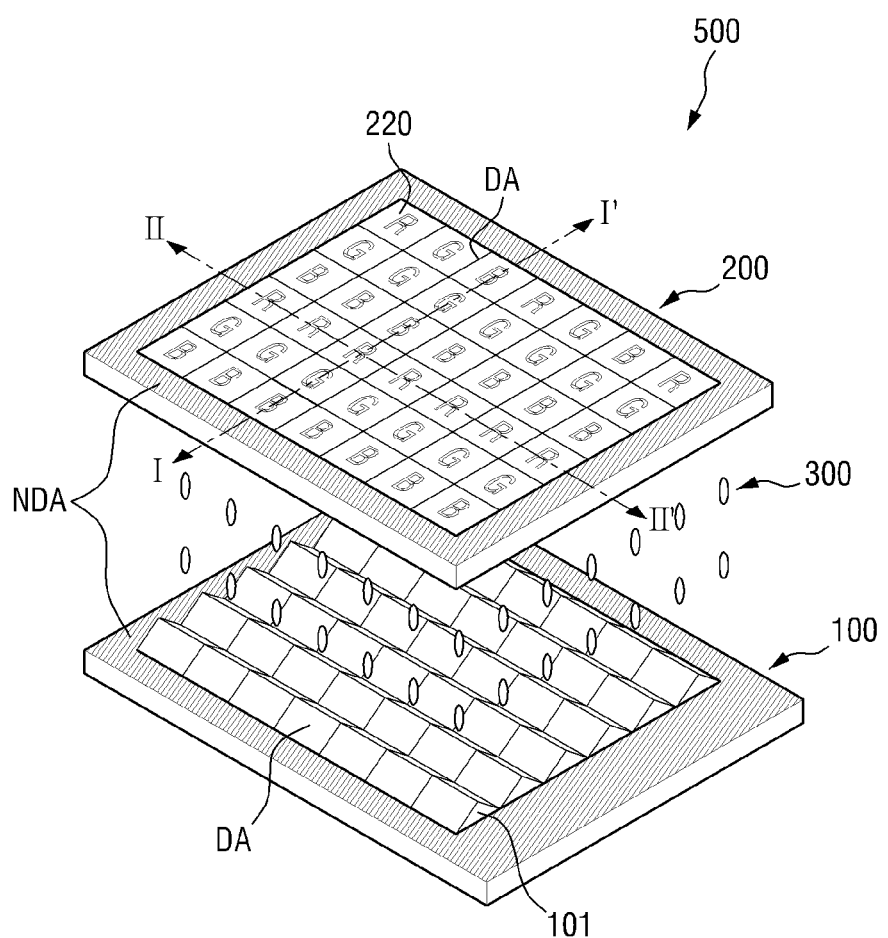
FIG. 1 is a exploded perspective view of a liquid crystal display ("LCD") according to an embodiment of the invention.

In the following description, for purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

It will be understood that when an element is referred to as being "on" another element, it can be directly on the other element or intervening elements may be present therebetween. In contrast, when an element is referred to as being "directly on" another element, there are no intervening elements present.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the invention.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. In an exemplary embodiment, when the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, preferred embodiments of the invention will be described in detail with reference to the attached drawings.

Figure 2:
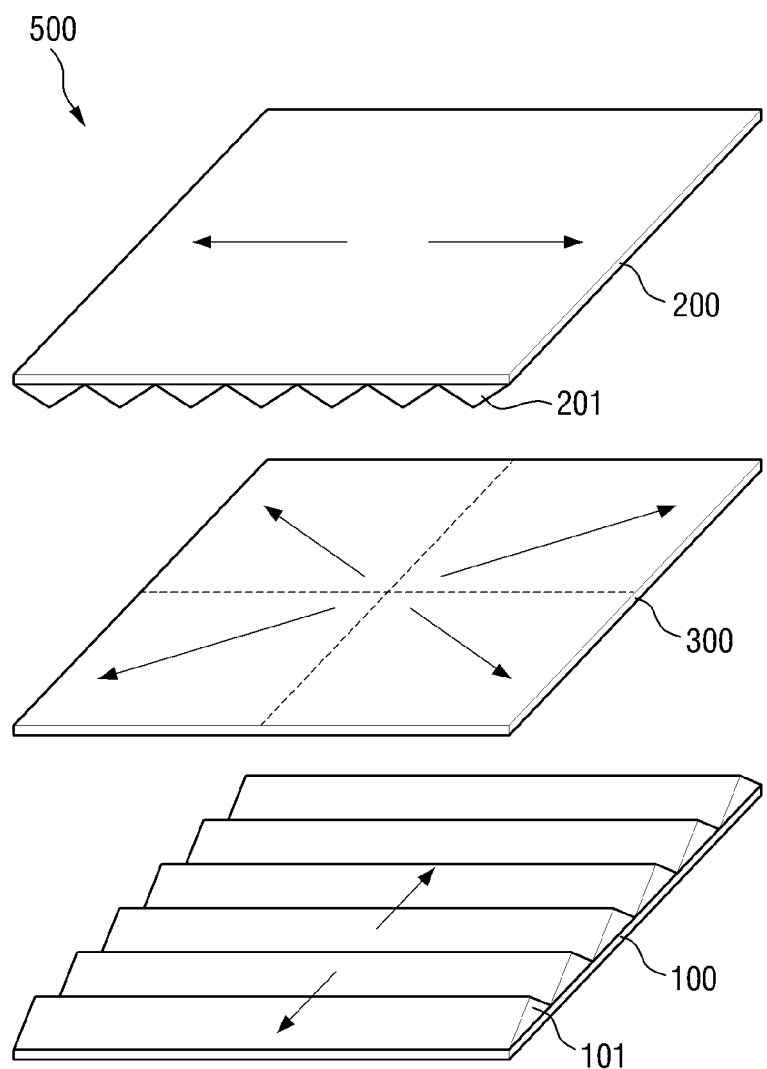
FIG. 2 is a exploded perspective view explaining an embodiment of the protrusions of the LCD according to the invention.
Figure 3:
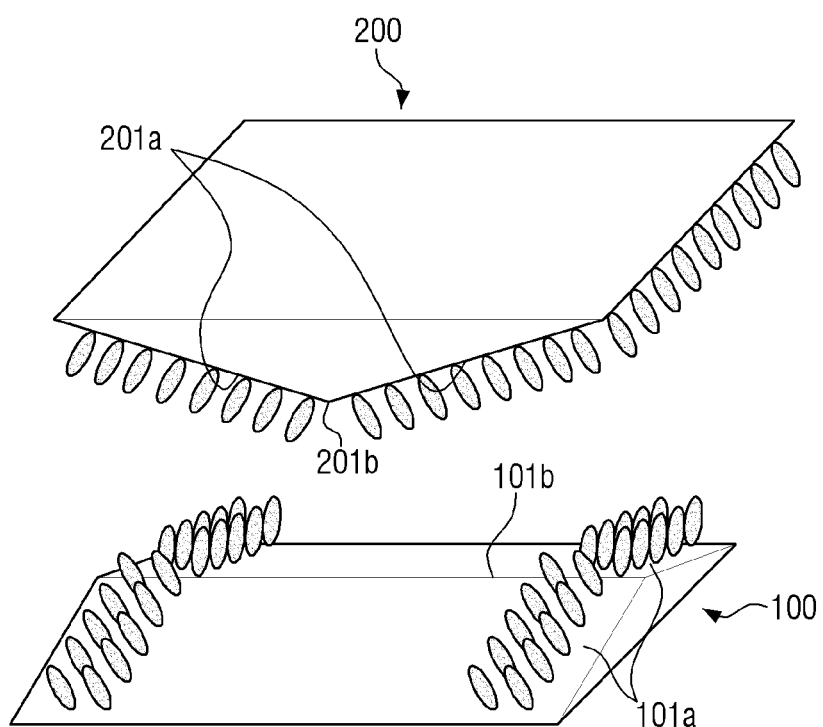
FIG. 3 is a exploded perspective view illustrating an embodiment of one pixel of the LCD according to the invention.

FIG. 1 is a schematic exploded perspective view of a liquid crystal display ("LCD") according to an embodiment of the invention, FIG. 2 is a schematic exploded perspective view explaining the protrusions of the LCD according to an embodiment of the invention, and FIG. 3 is a schematic exploded perspective view illustrating one pixel of the LCD according to an embodiment of the invention.

Referring to FIGS. 1 and 2, an LCD 500 according to an embodiment of the invention includes a first panel 100, a second panel 200, and a liquid crystal layer 300 interposed between the first panel 100 and the second panel 200.

The first panel 100 may include a display area DA and a non-display area NDA.

The display area DA of the first panel 100 may be provided with a plurality of data lines and a plurality of gate lines, and the plurality of data lines and the plurality of gate lines may define a plurality of pixels that may display an image. The display area DA of the first panel 100, shown in FIG. 3, may be provided with a plurality of first protrusions 101 arranged per each pixel. Each of the first protrusions 101 may include a first inclination 101a, which has a predetermined gradient, a first ridge 101b, which is a top of the first inclination 101a, and a first valley 101c (refer to FIG. 4), at which a protrusion of one pixel meets a protrusion of a pixel adjacent to the one pixel. Each of the first protrusions 101 may be extended in a first direction (for example, a horizontal direction) of the first panel 100.

The non-display area NDA of the first panel 100 may be provided with a driving unit capable of driving and controlling the plurality of data lines and the plurality of gate lines to allow a plurality of pixels to display an image.

The second panel 200 may be disposed to face the first panel 100. Like the first panel 100, the second panel 200 may include a display area DA and a non-display area NDA. In the display area DA of the second panel 200, a color filter 220 may be provided for each pixel. In an exemplary embodiment, the color filter 220 may include red (R), green (G), and blue (B), for example. In an exemplary embodiment, Red (R), green (G), and blue (B) may be alternately arranged. The display area DA of the second panel 200, shown in FIG. 3, may be provided with a plurality of second protrusions 201 arranged per each pixel. Each of the second protrusions 201 may include a second inclination 201a, which has a predetermined gradient, a second ridge 201b, which is a top of the second inclination 201a, and a second valley 201c (refer to FIG. 5), at which a protrusion of one pixel meets a protrusion of a pixel adjacent to the one pixel. Each of the second protrusions 201 may be extended in a second direction (for example, a vertical direction) of the second panel 200. In other words, the first protrusions 101 of the first panel 100 and the second protrusions 201 of the second panel 200 may be extended in a direction perpendicular to each other. Therefore, when a voltage is applied to each of the first panel 100 and the second panel 200 to generate an electric field, the liquid crystal molecules in the liquid crystal layer 300, as shown in FIG. 2, may be arranged at an angle of about 45 degrees by the sum of a vector of the first protrusions 101 and a vector of the second protrusions 201, for example. In other words, the LCD 500 according to an embodiment of the invention has a pre-tilt angle even when a photo-alignment technology is not used, and may differently control the direction of rotation of the liquid crystal molecules for each domain.

The non-display area NDA of the second panel 200 may be provided with a sealing member including a sealant in order to attach the second panel 200 to the first panel 100. The sealing member may be provided in the non-display area NDA of the first panel 100 as well as in the non-display area NDA of the second panel 200.

Hereinafter, the structure of each of the pixel, first protrusion 101 and second protrusion 102 of the LCD 500 according to an embodiment of the invention will be described in more detail with reference to FIGS. 3 to 6.

Figure 4:
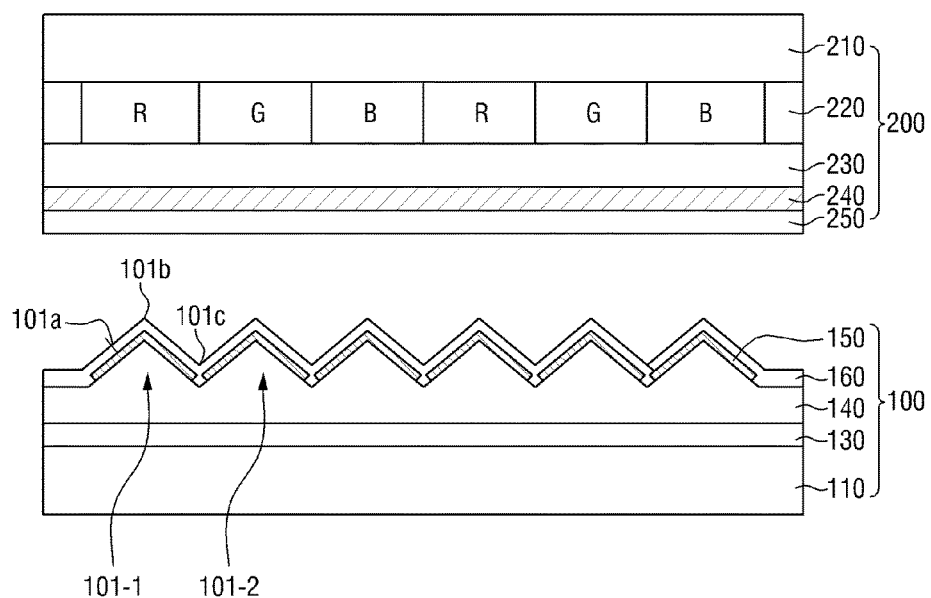
FIG. 4 is a cross-sectional view taken along line I-I' of FIG. 1.
Figure 5:
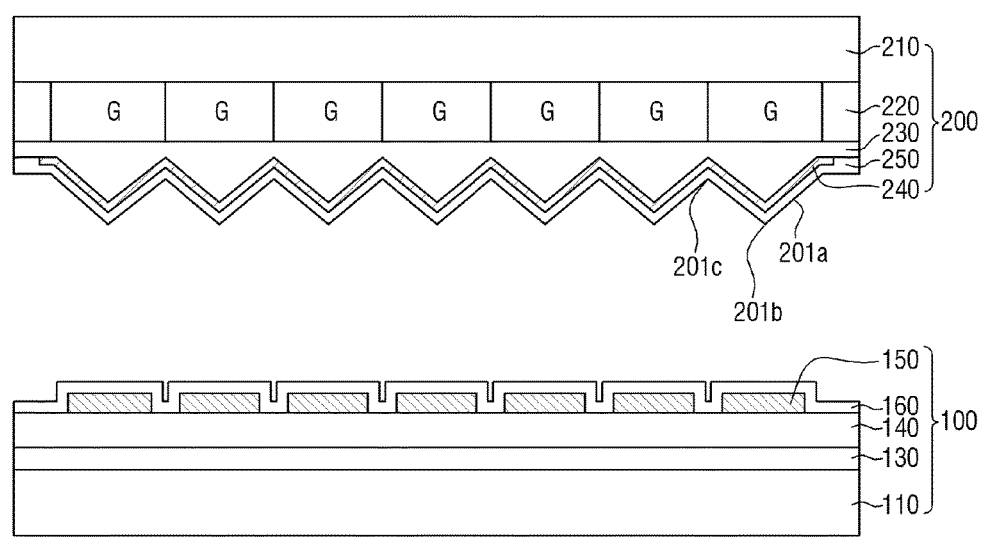
FIG. 5 is a cross-sectional view taken along line II-II' of FIG. 1.
Figure 6:
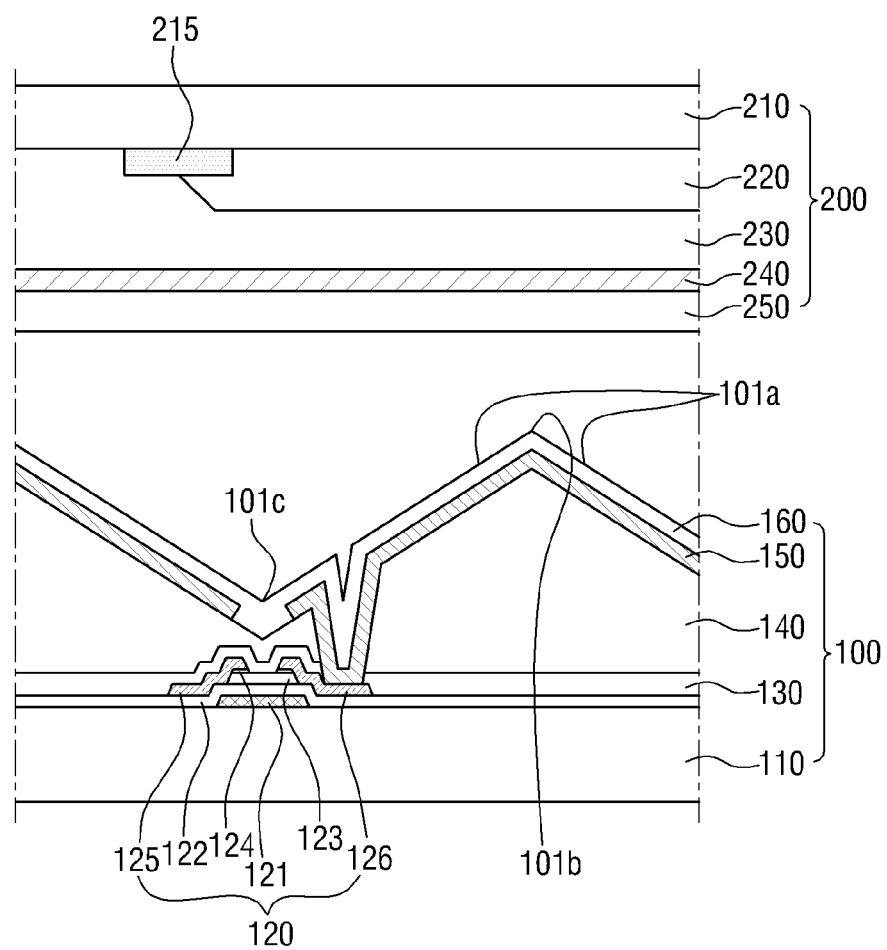
FIG. 6 is a cross-sectional view of FIG. 3.

FIG. 4 is a cross-sectional view taken along line I-I' of FIG. 1, FIG. 5 is a cross-sectional view taken along line II-II' of FIG. 1, and FIG. 6 is a cross-sectional view of FIG. 3.

First, referring to FIGS. 4 and 6, the first panel 100 may include a first insulating substrate 110 that may include an insulating material, such as transparent glass, quartz, ceramic, silicon, or transparent plastic, for example.

A gate electrode 121 is disposed on the first insulating substrate 110. In an exemplary embodiment, the gate electrode may include aluminum (Al) or an alloy thereof, silver (Ag) or an alloy thereof, copper (Cu) or an alloy thereof, molybdenum (Mo) or an alloy thereof, chromium (Cr), titanium (Ti), or tantalum (Ta), for example. In an exemplary embodiment, the gate electrode 121 may have a multi-layer film structure including two conductive films (not shown) having different physical properties. In an exemplary embodiment, one conductive film may include aluminum (Al) or an alloy thereof, silver (Ag) or an alloy thereof, or copper (Cu) or an alloy thereof, and the other conductive film may include molybdenum (Mo) or an alloy thereof, chromium (Cr), titanium (Ti), or tantalum (Ta), for example. Examples of such combinations may include a combination of a lower chromium film and an upper aluminum film, a combination of a lower aluminum film and an upper molybdenum film, and the like. However, the invention is not limited thereto, and the gate electrode 121 may include other various metals and conductors.

A gate insulating film 122 is disposed on the gate electrode 121. The gate insulating film 122 serves to insulate the gate electrode 121 disposed therebeneath from source and drain electrodes 125 and 126 disposed thereon. In an exemplary embodiment, the gate insulating film 122, for example, may include silicon nitride (SiNx), silicon oxide (SiO2), or the like, for example.

A semiconductor layer 123 is disposed on the gate insulating film 122. The semiconductor layer 123 is disposed to at least partially overlap the gate electrode 121, and provides a thin film transistor ("TFT") 120 together with the gate electrode 121, the source electrode 125, and the drain electrode 126. In an exemplary embodiment, the semiconductor layer 123, for example, may include hydrogenated amorphous silicon, polycrystalline silicon, or the like, for example. In FIG. 6, a case in which the semiconductor layer 123 is provided in the shape of an island is exemplified. However, the invention is not limited thereto, and the semiconductor layer 123 may have various shapes other than the island shape.

A resistive contact layer 124 is disposed on the semiconductor layer 123. The resistive contact layer 124 is disposed on end portions of the semiconductor layer 123, the source and drain electrodes 125 and 126 are disposed on the resistive contact layer 124, and the resistive contact layer 124 serves to reduce contact resistance. In an exemplary embodiment, the resistive contact layer 124, for example, may include n+ hydrogenated amorphous silicon doped with n-type impurities at a high concentration. In FIG. 6, a case in which the resistive contact layer 124 is provided in the shape of a pair of islands is exemplified. However, the invention is not limited thereto, and the resistive contact layer 124 may have various shapes. However, the resistive contact layer 124 has the same shape as the semiconductor layer 123.

The source electrode 125 and the drain electrode 126 are disposed on the resistive contact layer 124. When the source electrode 125 receives a data voltage from the plurality of data lines and a gate on voltage is applied to the gate electrode 121, the TFT 120 turns on. When the TFT 120 turns on, the data voltage supplied to the source electrode 125 is transmitted to the drain electrode, and is charged in a pixel electrode 150 connected to the drain electrode 126. In an exemplary embodiment, each of the source electrode 125 and the drain electrode 126, similarly to the gate electrode 121, may include aluminum, silver, copper, molybdenum, chromium, titanium, tantalum, or an alloy thereof, for example. The source electrode 125 is disposed to overlap the gate electrode 121. The drain electrode 126 is disposed to at least partially overlap the gate electrode 121, and is disposed to be spaced apart from the source electrode 125. Since the source electrode 125 and the drain electrode 126 are disposed to be spaced apart from each other, the resistive contact layer 124 may also be disposed such that the portion thereof contacting the source electrode 125 is spaced apart from the portion thereof contacting the drain electrode 126, and a part of the upper portion of the semiconductor layer 123 may be exposed between the source electrode 125 and the drain electrode 126.

A first protective layer 130 is disposed on the source electrode 125, the drain electrode 126, the partially exposed semiconductor layer 123, and the gate insulating film 122. A contact hole for exposing a part of the upper portion of the drain electrode 126 may be defined in the first protective layer 130 to electrically connect the drain electrode 126 with the pixel electrode 150. In an exemplary embodiment, the first protective layer 130, for example, may include an inorganic material, such as silicon nitride or silicon oxide, or a composite material, such as a-Si:C:O ora-Si:O:F, which is synthesized by plasma enhanced chemical vapor deposition ("PECVD").

A second protective layer 140 is disposed on the first protective layer 130. In an exemplary embodiment, the second protective layer 140 may be an organic film, for example. The second protective layer 140 may include a plurality of first protrusions 101 repeatedly arranged for each pixel. Each of the first protrusions 101 may include a first inclination 101a, a first ridge 101b, which is the top of the first inclination 101a, and a first valley 101c.

The first inclination 101a may include two slant planes for providing the first ridge 101b. In an exemplary embodiment, one of the two slant planes may be a slant plane which is inclined downward toward one side of the first inclination 101a, and the other one thereof may be a slant plane which is inclined downward toward the other side of the first inclination 101a, for example.

The first ridge 101b may be located so as to correspond to the center of the color filter 220 disposed for each pixel of the second panel 200. In other words, the first ridge 101b may be disposed between the two slant planes.

The first valley 101c is located between one first protrusion 101-1 and another first protrusion 101-2, each of which is disposed for each pixel. In other words, the first valley 101c may be disposed at the boundary of the pixels. In an exemplary embodiment, when one first protrusion 101-1 is located in a first pixel and another first protrusion 101-2 is located in a second pixel adjacent to the first pixel, the first valley 101c may be located between one first protrusion 101-1 and another first protrusion 101-2, for example. The first protrusions 101 of the second protective layer 140 may be provided by controlling a profile using a slit mask or a half-tone mask. In addition, these first protrusions 101 may be provided by various methods, such as etching and the like.

A contact hole for electrically connecting the drain electrode 126 with the pixel electrode 150 may be also defined in the second protective layer 140 provided with the first protrusions 101.

The pixel electrode 150 is disposed on the second protective layer 140 provided with the first protrusions 101. The pixel electrode 150 is provided along the first inclination 101a and first ridge 101b of each of the protrusion 101, but may not be provided at the valley 101c. The aforementioned TFT 120 may be disposed in a region corresponding to the first valley 101c at which the pixel electrode 150 is not disposed. The pixel electrode 150 may be electrically connected with the drain electrode 126 through the contact hole defined between the first protective layer 130 and the second protective layer 140. Therefore, when the gate electrode 121 receives a gate on signal to define a channel in the semiconductor layer 123, the TFT 120 turns on, the data voltage applied through the source electrode 125 is provided to the drain electrode 126, and the data voltage provided in this way is transmitted to the pixel electrode 150 through the contact hole to be charged in the pixel electrode 150. Thus, an electric field is generated by the difference between the voltage charged in the pixel electrode 150 and the voltage of the common electrode 240 disposed in the second panel 200, so as to rearrange the liquid crystal molecules in the liquid crystal layer 300. In an exemplary embodiment, the pixel electrode 150 may include a transparent conductive material such as polycrystalline indium tin oxide ("ITO") or indium zinc oxide ("IZO"), for example.

A first alignment layer 160 is disposed on the pixel electrode 150. The first alignment layer 160 may be disposed according to the shape of the first protrusion 101. In an exemplary embodiment, the first alignment layer 160 may include polyimide (PI). In the first alignment layer 160, liquid crystal molecules may not be aligned by a photo-alignment method. Since the first alignment layer 160 is provided according to the shape of the first protrusion 101, a vertical electric field is generated between the pixel electrode 160 and the common electrode 240 at the first valley 101c of the first protrusion, but an electric field slightly tilted from the vertical line is provided in a region in which the first inclination 101a is provided. In other words, an electric field may be provided such that liquid crystal molecules are tilted in directions different from each other based on the first ridge 101b. Therefore, a plurality of domains may be provided even when a slit-type electrode is not provided. In addition, since the liquid crystal molecules having a negative dielectric anisotropy tend to be tilted in a direction perpendicular to the direction of an electric field, in the case of the vertically-aligned initial liquid crystal molecules, there is no superiority or inferiority between the left rotation and right rotation of these liquid crystal molecules. Accordingly, the adjacent liquid crystal molecules may be rotated in mutually opposite directions, and, in this case, the time taken for the liquid crystal molecules to have a desired alignment angle may be delayed due to the occurrence of collision. However, as in an embodiment of the invention, when the first inclination 101a having a predetermined gradient is disposed based on the first ridge 101b and the liquid crystal molecules are arranged along the first inclination 101a, the liquid crystal molecules are naturally tilted, so as to cause superiority or inferiority in the direction of behavior of the liquid crystal molecules, thereby rapidly rotating the liquid crystal molecules in a predetermined direction.

The second panel 200 may include a second insulating substrate 210 including an insulating material such as transparent glass, quartz, ceramic, silicon, or transparent plastic.

A light blocking pattern 215 may be disposed on the second insulating substrate 210. The light blocking pattern 215 is disposed along the boundary of pixels to expose a pixel area. In other words, the light blocking pattern 215 may be disposed at the position corresponding to the first valley 101c of the first protrusion 101 of the first panel 100. The light blocking pattern 215 may include a material that blocks the transmission of incident light. In an exemplary embodiment, the light blocking pattern 215 may include a black organic polymer material including black dye or pigment or a metal (metal oxide) such as chromium (chromium oxide).

A color filter 220 may be disposed on the second insulating substrate 210 provided with the light blocking pattern 215. The color filter 220 may include an organic film including a dye or pigment expressing each color. A part of the color filter 220 may be extended to the light blocking pattern 215 located at the boundary of pixels to overlap the light blocking pattern 215.

An overcoating layer 230 may be disposed on the color filter 220. The overcoating layer 230 may include a transparent organic film. As shown in FIG. 5, the overcoating layer 230 may include a plurality of second protrusions 201 that may be disposed for each pixel. Each of the second protrusions 201 may include a second inclination 201a, a second ridge 201b, which is a top of the second inclination 201a, and a second valley 201c.

The second inclination 201a may include two slant planes for providing the second ridge 201b. In an exemplary embodiment, one of the two slant planes may be a slant plane which is inclined downward toward one side of the second inclination 201a, and the other one thereof may be a slant plane which is inclined downward toward the other side of the second inclination 201a.

The second ridge 201b may be located so as to correspond to the center of the color filter 220. The first ridge 101b disposed in the first panel 100 and the second ridge 201b disposed in the second panel 200 face each other, and may be disposed such that their respective extending directions are perpendicular to each other.

The second valley 201 (refer to FIG. 2) may be disposed at the boundary of the color filter 220 disposed for each pixel. In an exemplary embodiment, when the red (R) color filter is disposed in the first pixel and the green (G) color filer is disposed in the second pixel, the second valley 201c may be disposed at the boundary of the red (R) color filter and the green (G) color filer, for example. The second protrusions 201 of the overcoating layer 230 may be provided by controlling a profile using a slit mask or a half-tone mask. In addition, these second protrusions 201 may be provided by various methods, such as etching and the like.

The common electrode 240 may be disposed on the overcoating layer 230 including the second protrusions 201 according to the shape of the second protrusions 201. The common electrode 240 receives a common voltage, and generates an electric filed together with the pixel electrode 150 disposed in the first panel 100. In an exemplary embodiment, the common electrode 160, for example, may include a transparent conductive material such as ITO and IZO, or the like.

A second alignment layer 250 is disposed on the common electrode 240. The second alignment layer 250 may be disposed according to the shape of the second protrusion 201. In an exemplary embodiment, the second alignment layer 250 may include polyimide (PI), for example. In the second alignment layer 250, liquid crystal molecules may not be aligned by a photo-alignment method. Since the second alignment layer 250 is provided according to the shape of the second protrusion 201, a vertical electric field is generated between the pixel electrode 160 and the common electrode 240 at the second valley 201c of the second protrusion 201, but an electric field slightly tilted from the vertical line is provided in a region in which the second inclination 201a is provided. Further, in the LCD 500 according to an embodiment of the invention, an electric field may be provided such that liquid crystal molecules are tilted in directions different from each other based on the second ridge 201b. Therefore, a plurality of domains may be provided even when a slit-type electrode is not provided. In addition, since the liquid crystal molecules having a negative dielectric anisotropy tend to be tilted in a direction perpendicular to the direction of an electric field, in the case of the vertically-aligned initial liquid crystal molecules, there is no superiority or inferiority between the left rotation and right rotation of these liquid crystal molecules. Accordingly, the adjacent liquid crystal molecules may be rotated in mutually opposite directions, and, in this case, the time taken for the liquid crystal molecules to have a desired alignment angle may be delayed due to the occurrence of collision. However, as in an embodiment of the invention, when the second inclination 201a having a predetermined gradient is disposed based on the second ridge 201b and the liquid crystal molecules are arranged along the second inclination 201a, the liquid crystal molecules are naturally tilted, so as to cause superiority or inferiority in the direction of behavior of the liquid crystal molecules, thereby rapidly rotating the liquid crystal molecules in a predetermined direction.

The LCD 500 according to an embodiment of the invention is configured such that the first protrusion 101 is provided in the first panel 100, the second protrusion 201 is provided in the second panel 200, and the first protrusion 101 and the second protrusion 201 are disposed in a direction perpendicular to each other. Therefore the liquid crystal molecules may be arranged to have a pre-tilt angle, the number of domains may be increased, and it is not required to provide a slit-type electrode for increasing the number of domains, so as to further improve the viewing angle of the LCD 500.

Further, since the LCD 500 according to an embodiment of the invention does not use a photo-alignment method, it is not required to use a show mask, so as to reduce the manufacturing cost of the LCD 500.

Moreover, in the LCD 500 according to an embodiment of the invention, when the direction of the second protrusions 201 disposed in the second panel 200 matches with a curved direction, errors caused by misalignment may be prevented, and thus this LCD 500 may be more easily applied to curved LCDs.

The LCD having the above-mentioned effects may be various modified. Hereinafter, other various embodiments of the invention will be described with reference to FIGS. 7 to 13.

Figure 7:
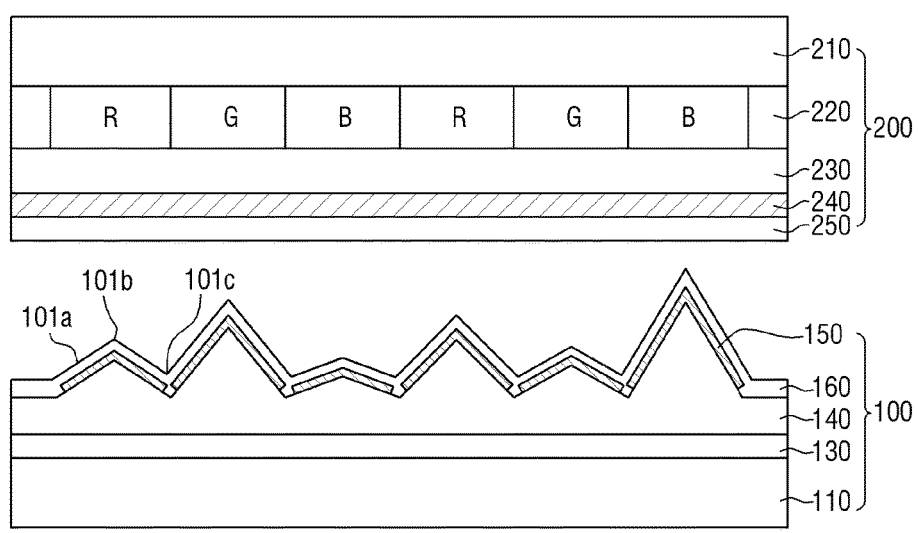
FIG. 7 is a cross-sectional view explaining another embodiment of the protrusions of an LCD according to the invention.

FIG. 7 is a cross-sectional view explaining the protrusions of an LCD according to another embodiment of the invention.

It is exemplified in the embodiment of FIG. 4 that a plurality of first protrusions 101 are arranged to have a predetermined angle, whereas it is exemplified in another embodiment of FIG. 7 that a plurality of first protrusions 101 may be arranged to have a different angle for each pixel. It is shown in FIG. 7 that only the first protrusions 101 of the first panel 100 have a different angle for each pixel. However, the invention is not limited thereto, and the second protrusions 201 of the second panel 200 may also have a different angle for each pixel.

Figure 8:
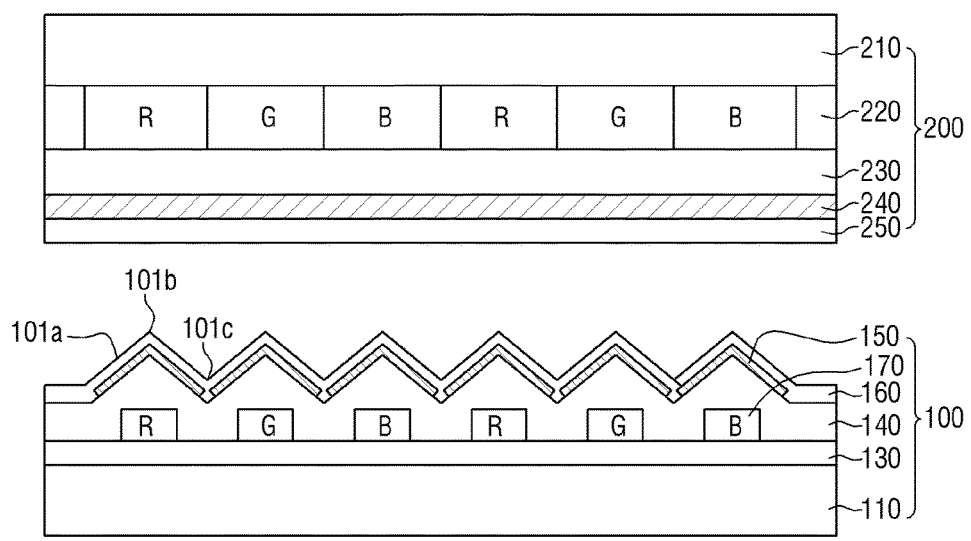
FIG. 8 is a cross-sectional view of another embodiment of an LCD according to the invention.
Figure 9:
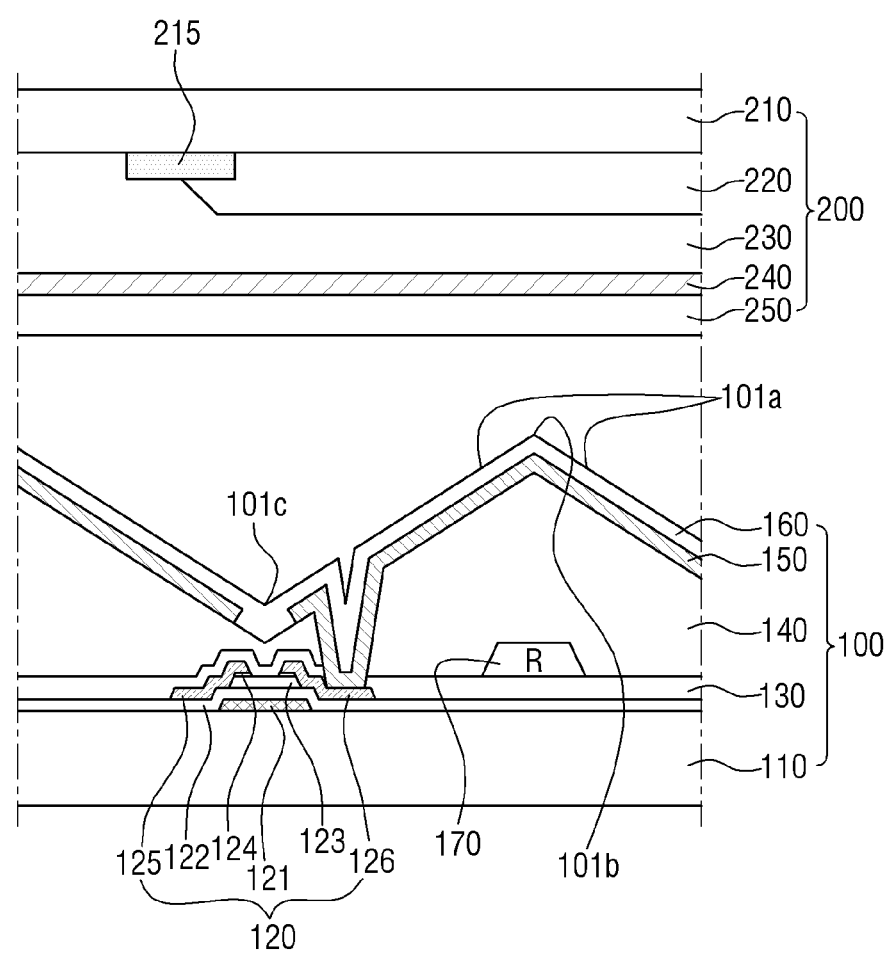
FIG. 9 is a cross-sectional view illustrating one pixel of the LCD of FIG. 8.

FIG. 8 is a cross-sectional view of an LCD according to another embodiment of the invention, and FIG. 9 is a cross-sectional view illustrating one pixel of the LCD of FIG. 8.

Referring to FIGS. 8 and 9, the LCD according to another embodiment of the invention is different from the above-mentioned LCD according to an embodiment of the invention in that color filters 170 are disposed in the first panel 100.

When the color filters 170 are disposed in the first panel 100, red (R), green (G), and blue (B) color filters are disposed for each pixel, and these color filters may be disposed on the first protective layer 130. Each of the color filters 170 may be disposed in a region overlapping the pixel electrode 150. After the color filters 170 is disposed on the first protective layer 130, the second protective layer 140 including the first protrusions 101 may be disposed on the color filters 170. Other arrangement structures will not be described because they are substantially identical to those shown in FIGS. 4 and 6.

Figure 10:
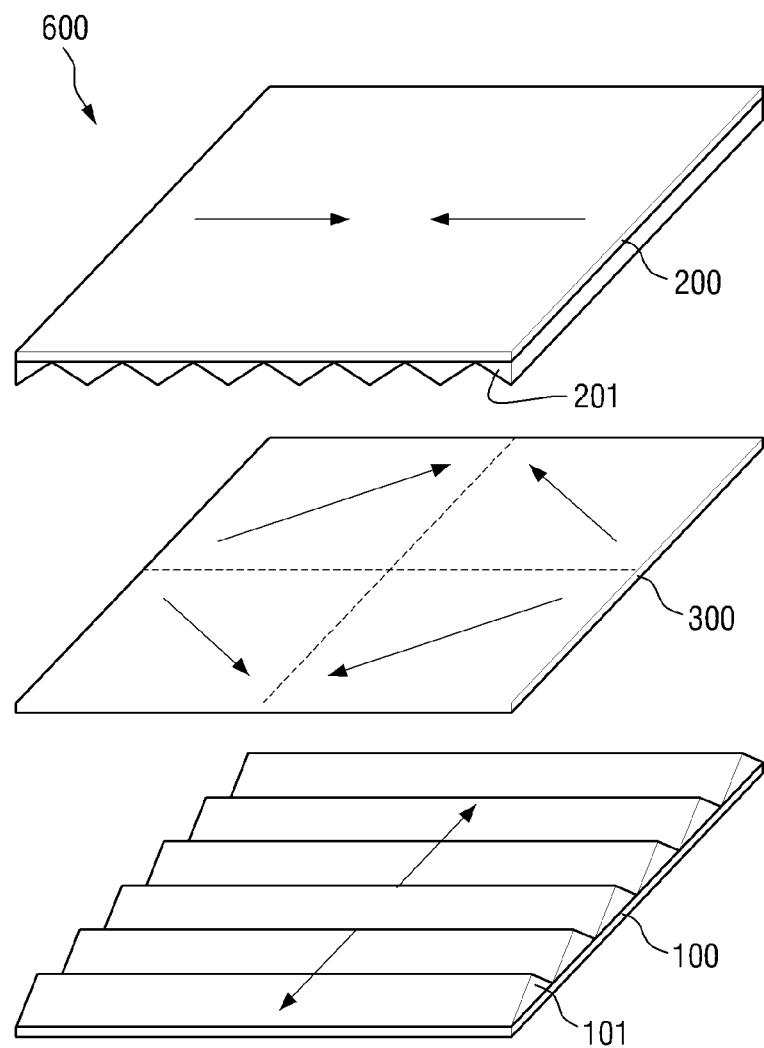
FIG. 10 is a exploded perspective view of another embodiment of an LCD according to the invention.
Figure 11:
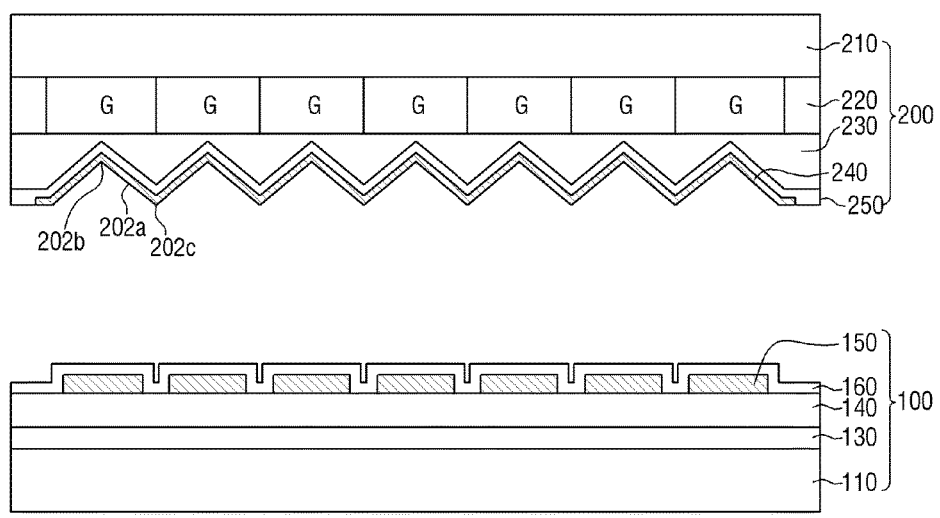
FIG. 11 is a cross-sectional view of the LCD of FIG. 10.

FIG. 10 is an exploded perspective view of an LCD according to another embodiment of the invention, and FIG. 11 is a cross-sectional view of the LCD of FIG. 10.

Referring to FIG. 10, the LCD 600 according to another embodiment of the invention is different from the above-mentioned LCD 500 in that the arrangement of the second protrusions 201 disposed in the second panel 200 is different from that of FIG. 2. Here, a description of the structure of the first panel 100 will be omitted because the structure of the first panel 100 shown in FIGS. 10 and 11 is the same as that shown in FIGS. 2 to 6.

Referring to FIG. 11 in order to describe the structure of the second panel 200 in detail, the color filters 220 may be disposed on the second insulating substrate 210, and the overcoating layer 230 may be disposed on the color filters 220.

In an exemplary embodiment, the overcoating layer 230 may include a transparent organic material, for example. The overcoating layer 230, as shown in FIG. 11, may include a plurality of second protrusions 202 that may be arranged for each pixel. Comparing FIG. 11 with FIG. 4, the second ridge 201b of the second protrusion 201 of FIG. 4 is disposed to correspond to the center of the color filter 220, that is, the center of each cell, whereas the second ridge 202b of the second protrusion 202 of FIG. 11 may be disposed to correspond to the boundary of the color filters 220, that is, the boundary of each pixel. In an exemplary embodiment, the second protrusion 202 in each pixel may have a V shape, for example.

As described above, the arrangement of liquid crystal molecules in the LCD 600 according to this embodiment is different from that in the above-mentioned LCD 500 because the second protrusion 202 of the second panel 200 is differently provided.

Figure 12:
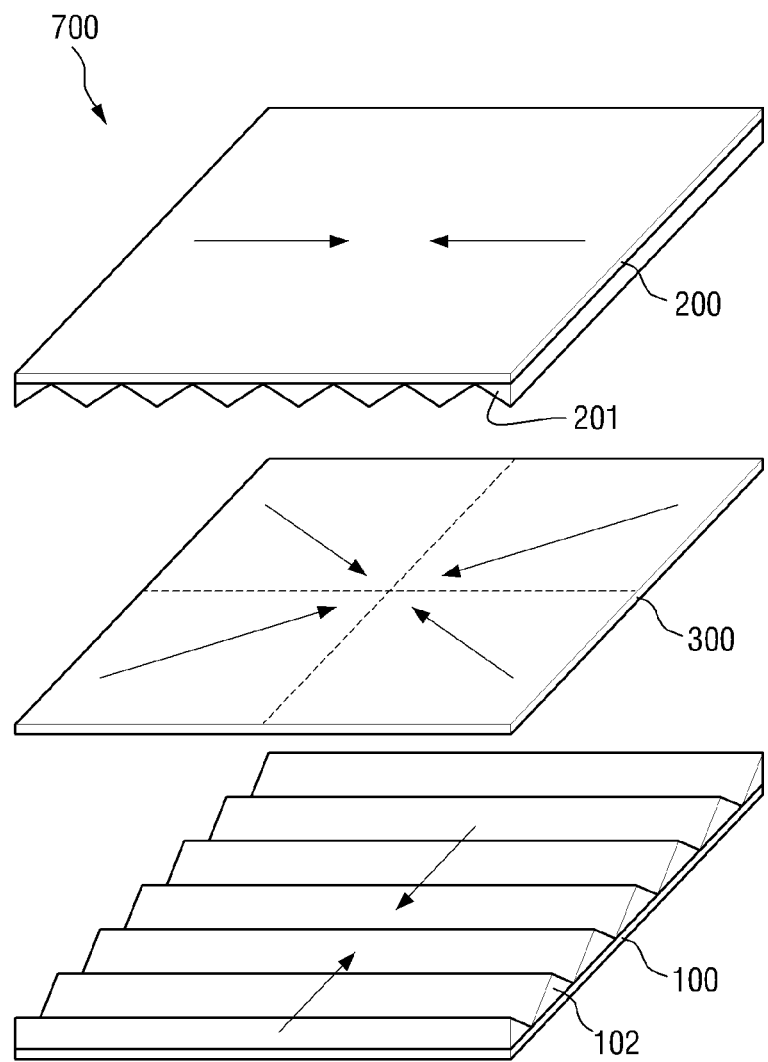
FIG. 12 is a exploded perspective view of another embodiment of an LCD according to the invention.
Figure 13:
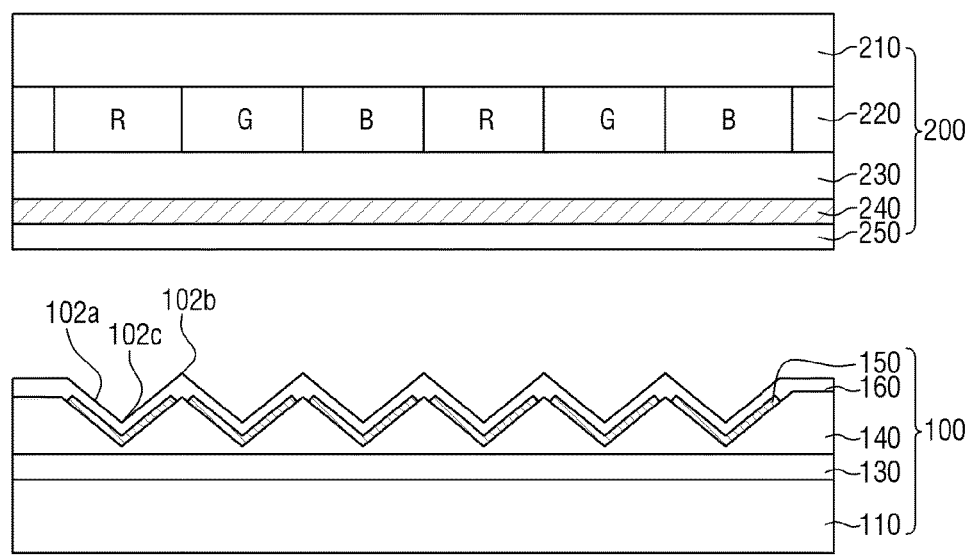
FIG. 13 is a cross-sectional view of the LCD of FIG. 12.

FIG. 12 is an exploded perspective view of an LCD according to another embodiment of the invention, and FIG. 13 is a cross-sectional view of the LCD of FIG. 12.

Referring to FIG. 12, the LCD 700 according to another embodiment of the invention is different from the above-mentioned LCD 500 or 600 in that the arrangement of the first protrusions 101 disposed in the first panel 100 is different from that of FIGS. 2 and 10. Here, a description of the structure of the second panel 200 will be omitted because the structure of the second panel 200 shown in FIGS. 12 and 13 is the same as that shown in FIG. 10.

Referring to FIG. 13 in order to describe the structure of the first panel 100 in detail, the TFT 120 may be disposed on the first insulating substrate 110, and the first protective layer 130 and the second protective layer 140 may be disposed on the transistor 120.

In an exemplary embodiment, the second protective layer 140 may include a transparent organic material, for example. The second protective layer 140, as shown in FIG. 3, may include a plurality of protrusions 102 that may be arranged for each pixel. Comparing the protrusion 101 of FIG. 13 with the protrusion 101 of FIG. 3, the first ridge 101b of the protrusion 101 of FIG. 3 is disposed to correspond to the center of each pixel, whereas the first ridge 102b of the protrusion 102 of FIG. 13 is disposed to correspond to the boundary of each pixel.

As described above, the arrangement of liquid crystal molecules in the LCD 700 according to this embodiment is different from that in the above-mentioned LCD 500 because the first protrusion 102 and the second protrusion 202 of the first panel 100 and the second panel 200 are differently provided.

Although certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A liquid crystal display comprising:
   a first panel which includes a first electrode including a first protrusion and a first alignment layer disposed on the first electrode;
   a second panel which is disposed to face the first panel, and which includes a second electrode including a second protrusion disposed in a region corresponding to the first protrusion and a second alignment layer disposed on the second electrode; and
   a liquid crystal layer which is disposed between the first panel and the second panel,
   wherein the first protrusion extends in a first direction,
   wherein the second protrusion extends in a second direction crossing the first direction,
   wherein each pixel of a plurality of pixels defined between the first and second panels has a single first protrusion of the first electrode and a single second protrusion of the second electrode, and
   wherein the first protrusion and the second protrusion cross each other in a plan view.

2. The liquid crystal display of claim 1, wherein each of the first alignment layer and the second alignment layer is a vertical alignment layer including polyimide.

3. The liquid crystal display of claim 1, wherein the first panel and the second panel are attached to each other to provide a plurality of pixels, and each of the plurality of pixels is provided with the first protrusion and the second protrusion.

4. The liquid crystal display of claim 3, wherein the first protrusion and the second protrusion provided in each of the plurality of pixels are diagonally inclined at predetermined angles, and the predetermined angles are different from each other for each of the plurality of pixels.

5. The liquid crystal display of claim 1, wherein the first protrusion comprises:
   a first inclination which is diagonally inclined upward in one direction;
   a second inclination which is diagonally inclined downward in the other direction; and
   a first ridge which is disposed between the first inclination and the second inclination,
   wherein the first ridge is located at a center of the first electrode.

6. The liquid crystal display of claim 5, wherein the second protrusion comprises:
   a third inclination which is diagonally inclined upward in one direction;
   a fourth inclination which is diagonally inclined downward in the other direction; and
   a second ridge which is disposed between the third inclination and the fourth inclination,
   wherein the second ridge faces the first ridge, and the second ridge extends in the second direction,
   wherein the second direction is perpendicular to the first direction.

7. The liquid crystal display of claim 1, wherein the first protrusion comprises:
   a first inclination which is diagonally inclined downward in one direction;
   a second inclination which is diagonally inclined upward in the other direction; and
   a first valley which is disposed between the first inclination and the second inclination,
   wherein the first valley is located at a center of the first electrode.

8. The liquid crystal display of claim 7, wherein the second protrusion comprises:
   a third inclination which is diagonally inclined upward in one direction;
   a fourth inclination which is diagonally inclined downward in the other direction; and
   a second ridge which is disposed between the third inclination and the fourth inclination,
   wherein the second ridge faces the first valley, and the second ridge extends in the second direction,
   wherein the the second direction is perpendicular to the first direction.

9. The liquid crystal display of claim 7, wherein the second protrusion comprises:
   a third inclination which is diagonally inclined downward in one direction;
   a fourth inclination which is diagonally inclined upward in the other direction; and
   a second valley which is disposed between the third inclination and the fourth inclination,
   wherein the second valley faces the first valley, and the second valley extends in the second direction,
   wherein the second direction is perpendicular to the first direction.

10. A liquid crystal display, comprising:
    a first insulating substrate;
    a switching element which is disposed on the first insulating substrate;
    a protective layer which is disposed on the switching element and which includes a first ridge, a first valley, and a first inclination diagonally inclined between the first ridge and the first valley;
    a pixel electrode which is disposed on the protective layer;
    a first alignment layer which is disposed on the pixel electrode;
    a second insulating substrate which is disposed to face the first insulating substrate;
    a color filter which is disposed on the second insulating substrate;
    an overcoating layer which is disposed on the color filter and which includes a second ridge, a second valley, and a second inclination diagonally inclined between the second ridge and the second valley;
    a common electrode which is disposed on the overcoating layer; and
    a second alignment layer which is disposed on the common electrode,
    wherein the first ridge and the first valley are disposed to correspond to the second ridge or the second valley,
    wherein the first ridge and the first valley extend in a first direction,
    wherein the second ridge or the second valley extends in a second direction crossing the first direction,
    wherein each pixel of a plurality of pixels defined between the first and second panels has a single first protrusion of the first electrode and a single second protrusion of the second electrode, and wherein the first protrusion and the second protrusion cross each other in a plan view.

11. The liquid crystal display of claim 10, wherein each of the first alignment layer and the second alignment layer is a vertical alignment layer including polyimide.

12. The liquid crystal display of claim 10, wherein the first ridge is disposed to correspond to a center of the pixel electrode.

13. The liquid crystal display of claim 12, wherein the second ridge is disposed to correspond to the first ridge.

14. The liquid crystal display of claim 13, wherein the switching element is disposed to correspond to the first ridge.

15. The liquid crystal display of claim 13, wherein a light blocking pattern is further disposed between the second insulating substrate and the color filter, and the light blocking pattern is disposed to correspond to the second valley.

16. The liquid crystal display of claim 10, wherein the first valley is disposed to correspond to a center of the pixel electrode.

17. The liquid crystal display of claim 16, wherein the second valley is disposed to correspond to the first valley.

18. The liquid crystal display of claim 17, wherein the switching element is disposed to correspond to the first ridge.

19. The liquid crystal display of claim 17, wherein a light blocking pattern is further disposed between the second insulating substrate and the color filter, and the light blocking pattern is disposed to correspond to the second ridge.

20. The liquid crystal display of claim 16, wherein the second ridge is disposed to correspond to the first valley.

* * * * *